3,022,210
METHOD OF MAKING MOLDING COMPOUNDS OF GLASS FIBER REINFORCED PLASTICS
Thomas E. Philipps, Manville, R.I., assignor to Owens-Corning Fiberglas Corporation, a corporation of Delaware
No Drawing. Filed Dec. 29, 1955, Ser. No. 556,077
9 Claims. (Cl. 156—180)

This invention relates to the manufacture of molded plastics reinforced with glass fibers and to compositions for use in same. It relates more particularly to the preparation of a molding compound of glass fibers in combination with a resinous material and to the method for the preparation and use of same in the fabrication of molded products and laminates.

The use of glass fibers to reinforce and strengthen resinous materials in the manufacture of molded plastics, laminates and coated fabrics represents one of the major advances in the technology of plastics and coated fabrics. Because of the exceptionally high strength which characterizes the glass fibers and because of their inertness, flexibility, good electrical resistance and heat stability, glass fibers have been employed in the fabrication of plastics and laminates of exceptionally high strength and of improved electrical, thermal and other characteristics.

Various techniques have been proposed for combining glass fibers with resinous materials employed in the manufacture of molded plastics, laminates, coated fabrics and the like. In most of these techniques, the glass fibers have been treated to modify the surface characteristics of the fibers to improve the bonding relationship between the resinous materials and the glass fiber surfaces and then the treated glass fibers have been combined with the resinous material in the final stages of the molding or laminating process. For the most part, use has been made of thermosetting resinous materials, preferably such materials as the liquid, unsaturated polyester resins which can be applied in a fluid phase onto the layers of glass fibers as they are formed to mold shape, followed by the advancement of the thermosetting resinous binder under heat and pressure to an infusible and insoluble cured stage while the composite mass is under pressure to consolidate the materials into a unitary composite product of mold shape.

Some modifications in technique have been employed but, in the main, the resinous materials and the glass fibers are usually brought together in the final molding stage wherein the resinous materials go through a fluid or plastic state for receiving the reinforcing glass fibers as a component thereof during consolidation into a composite product.

Attempts have been made to combine the resinous materials with the glass fibers to form an intermediate compound which could be used as a molding compound in the fabrication of molded products and laminates by conventional molding techniques, such as by injection or extrusion or compression molding, using the thermosetting and preferably the thermoplastic resinous materials.

The fabrication of molded or laminated products from molding compounds formed of resinous materials-glass fiber combinations is difficult, though less difficult with the thermosetting resinous materials than with the thermoplastics. It is believed that this is because the thermosetting resinous materials pass through an A and B stage before being advanced to the cured stage and that the flow characteristics while in the A and B stage are such that a sufficient degree of consolidation can be achieved during the molding cycle. Even then, flow is limited and it becomes necessary uniformly to distribute the molding compound through the mold and to limit use of the molding compound to the formation of articles requiring very little actual flow during molding.

Preparation of a molding compound formed of a glass fiber and a thermoplastic resinous material which is satisfactory for use in the manufacture of molded products by conventional molding techniques which are normally employed in the molding of thermoplastic materials without the presence of glass fibers, such as injection molding or extrusion molding, has been found to be even more difficult.

Description hereinafter will be made of the preparation of a molding compound of the type described and of a molded product or laminate fabricated of the combination of a thermoplastic resinous material and glass fibers wherein the glass fibers are present in sufficient amounts and of lengths to contribute materially to the stability and strength of the product. The molding compound prepared in accordance with the practice of this invention is further capable of flow sufficient for processing by conventional molding techniques, such as by compression molding, injection molding or extrusion molding without noticeable segregation or separation of the fibrous compounds with respect to the thermoplastic resinous materials and without noticeable destruction of the glass fibers.

In the preparation of a molding compound and product of the type described, one cannot employ materials which would normally be used nor can one make use of processes which might normally be employed for effecting combinations of a resinous material and glass fibers in the manufacture of a molding compound. For example, it has been found that when glass fibers in the form of filaments, strands or yarns, cut to shorter lengths, such as in the range of ¼ to 1 inch in length, are incorporated with a polystyrene resin of a commercial grade having a molecular weight in excess of 50,000 and generally in the range of 75,000 to 120,000, a product is secured which is incapable of use for commercial molding. Any benefit which is secured is more than offset by the increased forces required to achieve the desired flow characteristics for filling the mold and by the inability properly to fill the mold with the compound, let alone a compound in which the glass fibers are still present in the desired uniformity of distribution.

One of the more important concepts of this invention resides in the formulation of a molding compound in which the resinous component in the form of a polystyrene is limited to an average molecular weight which is less than 20,000. This is considerably under the molecular weight average of the polymers which have been made available for commercial use in the manufacture of plastics. However, when a polystyrene having a low molecular weight average of the type described is employed, the molding compound that is formed can be injection molded, compression molded or extrusion molded on conventional machines without material change of the molding conditions and full utilization of the glass fiber components to produce a molding compound having exceptionally high strength properties.

It is believed that the combination which makes use of a low molecular weight resinous material of the type described enables the glass fiber surfaces to be more completely and quickly wet out with the resinous material so that the glass fibers can become more completely integrated with the resin for flow together during molding under heat and compression. Further, the resinous material has flow characteristics more compatible with the forces capable of being tolerated by the glass fibers with the result that the mass of fibers, in the form of filaments, bundles, yarns or rovings, are able to retain their integrity during the molding step to remain with the resin in uniform distribution in the molded product.

It is believed further that the combination which makes use of glass fibers of the type described with the low molecular weight resinous polymer is a factor also in the successful formulation of a molding compound and product because the glass fibers constitute solid, rod-like members having prefectly smooth surfaces. This enables full utilization of the resinous component for wetting the glass fiber surfaces and to integrate the glass fibers immediately into the resinous phase to form what appears to be a single phase system capable of uniform flow in molding. The character of the smooth surface existing on the solid, rod-like glass fibers also appears materially to contribute to the ability to integrate the glass fibers into a phase with the resinous material since the smooth, non-porous surfaces militate against the development of air pockets which interfere with the production of an acceptable molded product. The perfectly smooth surfaces on the glass fibers enables the glass fibers more completely and immediately to be wet out by the resinous material to provide flow with a lesser amount of resin than otherwise would be required. This is to be distinguished from the effect which other porous fibers, such as cotton, asbestos, hemp and the like, have upon the flow characteristics of plastic materials in which they are incorporated and in which they are incorporated in amounts considerably less than the amount of glass fibers that can be employed in accordance with the practice of this invention.

Another important concept which is embodied as a feature of this invention resides in the means by which the glass fibers and the thermoplastic materials of low molecular weight are compounded together to form a molding compound and molded product.

For application onto glass fibers or other fabrics, the thermoplastic resinous materials are usually formulated into an aqueous dispersion or solvent solution containing as high a concentration of the resinous polymer as possible. When use is made of an aqueous emulsion containing the resinous material dispersed as fine particles, it becomes necessary to process the coated fibers first to drive off the water and then it becomes necessary further to heat the coated fibers to a still higher temperature for fusion of the resin onto the glass fiber surfaces. In addition, the coated fibers that are formed remain full of voids in the areas from which the diluent has been displaced. These voids are evidenced by a milky appearance of the coated glass fibers which have been gathered together into bundles for cutting or chopping into lengths suitable for use as a molding compound. The voids represent small islands of air or pockets which are difficult to remove or eliminate during the molding step. As a result, the voids remain in the molded product materially to detract from the appearance thereof and from the physical properties of the product that is formed.

When the resinous component is applied from a solvent solution instead of an aqueous dispersion, additional difficulties arise because of the difficulty to eliminate the last traces of solvent from the coated fibers. Such means for the application of the resinous component on the glass fiber surfaces is also expensive by reason of the higher cost of the solvent materials and the necessity to make use of recovery equipment to cut down on the losses thereof. Although the resinous materials form on the glass fibers in a uniform layer which does not require fusion, an extended heat treatment is required for the removal of the last traces of solvent from the coating. Thus the solvent systems are objectionable not only because of the limited amount of resin that can be applied in an economical and efficient manner but because of the cost of the solvents and the difficulties in removing the solvents from the applied resinous coating. Further, the solvent system also leaves many voids in the glass fiber surfaces which are difficult to remove in molding to militate against the presence of such voids in the molded product.

It has been found that the use of a low molecular weight resinous polymer enables the resinous binders to be heated to an elevated temperature for reduction to a substantially fluid stage without thermal decomposition. As a result, the glass fibers can be drawn through the melt or dipped into the melt to coat the glass fibers with the full complement of resin and the coated fibers can be gathered into bundles or else drawn through the melt as a bundle and then cut or chopped into suitable lengths for use as a molding compound after the resinous material has cooled to a solidified state on the glass fiber surfaces.

The molding compound produced in accordance with the practice of this invention is substantially free of voids or entrapped air bubbles such as characterize products formulated by the application of the resinous binder from aqueous dispersion or solvent solution and the molding compound is free of diluents characteristic of products formulated from solvent systems.

In addition to the production of a molding compound that is free of entrapped gases and which does not require additional processing steps to fuse the resins or to rid the coated fibers of solvents, the system employed in the practice of this invention enables the use of glass fibers which have been treated with an anchoring agent to enhance the wetting out characteristics of the glass fibers and to improve the bonding relationship between the glass fibers and the thermoplastic resinous binder. Thus it becomes possible to achieve further utilization of the strength characteristics inherent in the glass fibers and to enhance the flow of the molding compound during molding under heat and compression.

By way of still further improvements, the system which embodies the application of the low molecular weight thermoplastic resinous binder as a hot melt to the glass fibers enables an improved molding compound to be formed at a rate which is much higher than could be secured by the application of the resinous binder from aqueous dispersion or solvent solution. For example, the rate of production of the molding compound prepared in accordance with the concepts of this invention has been calculated to be from 7–10 times greater than that which is possible when the resinous binder is applied from solvent solution or aqueous dispersion.

The low molecular weight resinous polymer should preferably represent more than 50 percent by weight of the molding compound but it is preferred to make use of a compound in which 65–90 percent by weight is represented by the low molecular weight thermoplastic resinous materials while from 10–35 percent by weight is represented by the glass fibers. A molding compound of increased strength characteristics can be produced by the use of less than 10 percent by weight of glass fibers and more than 90 percent by weight of resin but the development of maximum strength properties is not secured. In any event, it is necessary to make use of glass fibers in amounts greater than 5 percent by weight to achieve any substantial amount of improvement.

In the practice of this invention, use can be made of glass fibers preferably in the form of filaments but it is preferred to make use of glass fibers in the form of strands, yarns, rovings or mats in which the glass fibers are present in bundles to enhance their reinforcing effect and in which the glass fiber rovings, strands, yarns or bundles are dipped, drawn, or otherwise immersed in the melt of the low molecular weight resinous polymer for the application of the full complement of resinous material to the glass fibers. After the full complement of the low molecular weight resinous polymer has been applied to the glass fiber surfaces from a hot melt and after the resinous materials have been solidified upon cooling, the rovings, strands or yarns are cut or chopped to lengths in the order of ⅛ to 1 inch in length to form a molding compound. In the event that the glass fibers are employed in the form of filaments, it is desirable to gather the filaments together in the form of endless bundles before or after being drawn through the melt followed by cutting or chopping the bundles to lengths desired for the molding compound.

Excesses in the amount of low molecular weight polymer can be eliminated from the coated fibers by advancing the fibers immediately after coating through a heated die to compress the fibers into a more compact bundle, to work the resinous material into and about the fibers, and to strip the excess resinous binder from the fibers while the resinous material is still in a fluid or plastic stage. Thus a molding compound which is substantially free of voids and entrapped gases and which is compacted to form a solid product is secured for use in molding.

Example 1

By way of illustration, polystyrene resin having an average molecular weight of about 15,000 is heated to a temperature of about 350° F. to provide a molten bath. A fiber structure formed of 60 endless strands of glass fibers each weighing about 1 pound per 14,000 feet is pulled through the bath, then through dies heated to a temperature of 300–450° F. to distribute the resin, compact the resinous glass fiber combination and strip the excess resin from the glass fiber surfaces. The coated strands are cooled to solidify the low molecular weight polystyrene and then they are chopped to within the range of ⅛ to 1 inch in length. An amount of resinous material corresponding to 60–70 percent by weight of the product is allowed to remain on the glass fibers.

The chopped strands of coated fibers can be cooled by conventional means in a compression press fitted for heating and cooling or they can be employed for molding by injection or extrusion processes.

As previously pointed out, the surfaces of the glass fibers can be treated to coat the glass fiber surfaces with an agent that improves the wetting out characteristics and the bonding relationship between glass fiber surfaces and the low molecular weight polystyrene resin. For such purposes, use can be made of Werner complex compounds of the type described in the Steinman Patent No. 2,552,910, wherein the glass fibers are described as treated by a compound in which the carboxylato group coordinated with the trivalent nuclear chromium atom has less than 8 carbon atoms and contains an unsaturated group or other highly functional group. A compound of the type described is represented by methacrylato chromic chloride which is effective when applied in amounts ranging from 0.01 to 1.0 percent by weight of the glass fibers.

Instead, use can be made of an unsaturated organosilicon compound of the type described in the Steinman Patent No. 2,563,288, such as diallyl diethoxy silane, allyl triethoxy silane, allyl methyldiethoxy silane or use can be made of a cationic amine compound of the type described in the Steinman Patent No. 2,563,289, such as the polyesterifications based on the known alkyd and polyamide resinous reactions wherein a hydroxy amino acid, such as α-amino-β-hydroxypropionic acid, P-hydroxy-phenylalanine or N-methyltyrosine is used instead of a hydroxy acid or when a di- or polyhydroxy amine, such as triethanol amine, colamine and the like is substituted for the polyhydric alcohol; an addition type polymer formed of such monomers as the amides of acrylic, methacrylic or alkyl acrylic acids; the polymers of N-vinyl derivatives such as N-vinyl pyrrolidene and N-vinyl hexahydrophthalimidene, ortho-vinyl pyridine and the like. These compounds are also effective when applied in amounts corresponding to the Werner complex compound. In any event, it is desirable to remove any previously applied size or lubricant from the glass fiber surfaces and to make use of bare glass fibers which can be more readily and more completely wet out by the low molecular weight resins, unless, of course, an anchoring agent of the type described is employed.

Though not equivalent to polystyrene, use can be made of other resinous polymers and compounds but in which the polymers employed are selected to have a viscosity characteristic at the elevated temperature employed for coating and molding which is comparable to a polystyrene having a molecular weight average of less than 20,000 but which are solid at room temperature. Under such conditions, the polystyrene in Example 1 can be substituted by low molecular weight polymers of polyvinyl chloride, methyl methacrylate, or other alkyl polyacrylates, vinylidene chloride, coumarone indene resin and the like in which the resinous materials are adapted to be present in substantially equivalent amounts.

By way of modification, the low molecular weight resinous polymers can be combined with the glass fibers directly under heat and pressure as in a molding operation to form a laminate by forming the low molecular weight polymer into sheets which can be plied with layers of glass fibers preferably in the form of an open mat wherein the glass fibers are bonded with a resinous material preferably corresponding with the low molecular weight polymer employed in the manufacture of the lamina or other resinous polymer which is readily wet out thereby as illustrated by the following example.

Example 2

Sheets of low molecular weight polyvinyl chloride (30,000 M.W.) are plied with mats of grass fibers having a swirl pattern or in which the glass fibers are in haphazard arrangement and in which they are bonded one to the other in the mat by (50–70 percent by weight) of a polyvinyl chloride resinous material. The plies are compressed between platens heated to a temperature sufficient to reduce the polyvinyl chloride of low molecular weight to a readily flowable state (250–350° F.) whereby the low molecular weight polyvinyl chloride flows into the interstices of the mat and about the fibers to integrate the fibers into the composite structure without destroying the fibrous character of the glass. Upon cooling of the platens to a temperature below that for solidification of the polyvinyl chloride of low molecular weight, the formed laminate can be removed from the mold.

In the above example, the polyvinyl chloride of low molecular weight is introduced in amounts to provide 75–80 percent by weight of the molded laminate while the glass fiber component represents the remainder. The improved conditions of the glass fibers and the more complete integration of the glass fibers into the molded product is evidenced by the increased strength of the molded laminate when compared with laminates formed of substantially the same materials molded under substantially the same conditions but in which the polyvinyl chloride resin represents the commercial grades available in molecular weight averages greater than 50,000. A laminate prepared in accordance with the practice of this invention having about 78 percent by weight of low molecular weight polyvinyl chloride resin gives a flexure strength of about 16,200 pounds per square inch whereas a laminate fabricated of the same materials, with the exception that a higher molecular weight polyvinyl chloride resin is employed, gives a flexure strength of 12,600 pounds per square inch. Normally, it would be expected that the higher molecular weight polymer would give the higher strength properties but the opposite is secured in this case because it is believed that the lower molecular weight resinous materials are capable, in combination with the glass fibers, of achieving a fuller utilization of the strength properties of the glass fibers and that the combination of materials is capable of being molded to impart improved flow characteristics without destroying the fiber characteristics of the glass.

Instead of making use of a swirl mat of glass fibers bonded with a polyvinyl chloride resin, use can be made of mats otherwise formed in which the fibers are arranged in haphazard arrangement or use can be made of an open mesh textile fabric in which no bonding resins are employed. In the event that a binder is employed, the polyvinyl chloride can be subsituted in corresponding amounts with a saturated polyester resin or the like resinous polymer which is easily wet out by the low molecular weight polymers intended to form the continuous phase of the molded product.

It will be understood that changes may be made in the details of formulation, construction, and in the processing, within the limitations described with reference to the molecular weight of the resinous polymer and its application to the glass fiber bundles in the form of a hot melt, without departing from the spirit of the invention, especially as defined in the following claims.

I claim:

1. In the preparation of a thermoplastic molding compound of the combination of a thermoplastic resinous polymer and glass fibers of reinforcing lengths, the steps of heating a polystyrene having an average molecular weight of less than 20,000 to a temperaure sufficient to reduce the polystyrene resinous polymer to a fluid state but below that at which the polystyrene is subject to thermal decomposition, advancing glass fibers through the hot melt of the polystyrene whereby an amount of polystyrene remains as a coating on the glass fiber surfaces sufficient for use as a molding compound, cooling the coated glass fibers to solidify the polystyrene on the surfaces thereof, and then reducing the coated glass fibers to lengths within the range of ⅛ to 1 inch.

2. The preparation of a molding compound as claimed in claim 1 in which the amount of polystyrene present on the glass fiber surfaces is within the ratio of 50–95 parts by weight of the polymer to 5–50 parts by weight of glass fibers.

3. The preparation of a molding compound as claimed in claim 1 in which the materials are present in the ratio of 65–90 parts by weight of the polystyrene to 10–35 parts by weight of glass fibers.

4. The preparation of a molding compound as claimed in claim 1, in which the surfaces of the glass fibers are modified to make the surfaces more receptive to the polystyrene by coating the glass fiber surfaces with an anchoring agent.

5. The preparation of a molding compound as claimed in claim 4 in which the anchoring agent applied to the glass fiber surfaces is a Werner complex compound in which the carboxylato group coordinated with the trivalent nuclear chromium atom contains 8 carbon atoms and an unsaturated carbon to carbon linkage.

6. The preparation of a molding compound as claimed in claim 4 in which the anchoring agent on the glass fiber surfaces comprises a cationic amine in which the organic group attached to the basic nitrogen atom is formed of less than 8 carbon atoms and contains an unsaturated carbon to carbon linkage.

7. The preparation of a molding compound as claimed in claim 4 in which the anchoring agent on the glass fiber surfaces comprises an organo-silicon compound in which an organo group attached to the silicon atom contains less than 8 carbon atoms and an unsaturated carbon to carbon linkage.

8. The preparation of a thermoplastic molding compound as claimed in claim 1 in which the glass fibers are advanced through the hot melt in the form of endless bundles.

9. The preparation of a thermoplastic molding compound as claimed in claim 1 in which the glass fibers are advanced through the hot melt as endless filaments and which includes the additional step of gathering a plurality of the coated filaments together to form a compact bundle while the polystyrene is still in a fluid state.

References Cited in the file of this patent

UNITED STATES PATENTS

| | | |
|---|---|---|
| 2,311,613 | Slayter | Feb. 16, 1943 |
| 2,315,259 | Hyde | Mar. 30, 1943 |
| 2,418,904 | Rugeley et al. | Apr. 15, 1947 |
| 2,444,347 | Greger et al. | June 29, 1948 |
| 2,454,851 | Warner et al. | Nov. 30, 1948 |
| 2,495,640 | Muskat | Jan. 24, 1950 |
| 2,541,927 | Kropa et al. | Feb. 13, 1951 |
| 2,558,855 | Knewstubb et al. | July 3, 1951 |
| 2,572,407 | Talet et al. | Oct. 23, 1951 |
| 2,653,090 | Crandall | Sept. 22, 1953 |
| 2,662,044 | Morrison et al. | Dec. 8, 1953 |
| 2,680,272 | Radtke | June 8, 1954 |
| 2,688,580 | Fingerhut | Sept. 7, 1954 |
| 2,688,774 | Malinowski et al. | Sept. 14, 1954 |
| 2,698,558 | Hawley et al. | Jan. 4, 1955 |
| 2,723,215 | Biefeld et al. | Nov. 8, 1955 |
| 2,730,455 | Swann | Jan. 10, 1956 |
| 2,741,294 | Pancherz | Apr. 10, 1956 |
| 2,746,896 | Thompson | May 22, 1956 |
| 2,763,573 | Biefeld | Sept. 18, 1956 |
| 2,766,162 | Boehm et al. | Oct. 9, 1956 |
| 2,778,764 | Morrison | Jan. 22, 1957 |
| 2,801,189 | Collier | July 30, 1957 |
| 2,835,221 | Slayter et al. | May 20, 1958 |
| 2,877,501 | Bradt | Mar. 17, 1959 |